United States Patent [19]
Kempas

[11] Patent Number: 5,144,743
[45] Date of Patent: Sep. 8, 1992

[54] METHOD OF COMPENSATING FOR TOLERANCES IN A ROTARY MOUNTING HAVING BALL BEARINGS

[75] Inventor: Hagen Kempas, Illmeusee, Fed. Rep. of Germany

[73] Assignee: Bodenseewerk Gerätetechnik GmbH, Fed. Rep. of Germany

[21] Appl. No.: 630,561

[22] Filed: Dec. 20, 1990

[30] Foreign Application Priority Data

Dec. 21, 1989 [DE] Fed. Rep. of Germany ....... 3942335

[51] Int. Cl.$^5$ .............................................. B21D 53/00
[52] U.S. Cl. .............................. 29/898.09; 29/898.07; 29/898.12; 74/5 F; 384/495; 384/537
[58] Field of Search ............. 29/724, 898.04, 898.062, 29/898.07, 898.09, 898.12; 74/5 F; 384/495, 537, 542

[56] References Cited

U.S. PATENT DOCUMENTS

| | | | |
|---|---|---|---|
| 3,249,986 | 5/1966 | Adkins | 29/898.09 |
| 3,251,117 | 5/1966 | Maynard et al. | 29/898.09 |
| 3,700,290 | 10/1972 | Ensinger | 403/291 |
| 4,380,108 | 4/1983 | Craig | 74/5 F |
| 4,523,864 | 6/1985 | Walter et al. | 384/613 |
| 4,665,605 | 5/1987 | Kempas | 29/434 |
| 4,854,750 | 8/1989 | Lavin | 384/500 |

FOREIGN PATENT DOCUMENTS

| | | |
|---|---|---|
| 1066389 | 10/1959 | Fed. Rep. of Germany . |
| 3018091C2 | 11/1981 | Fed. Rep. of Germany . |
| 3507233 | 9/1986 | Fed. Rep. of Germany . |
| 3631287 | 3/1987 | Fed. Rep. of Germany . |
| 3710185A1 | 10/1988 | Fed. Rep. of Germany . |

OTHER PUBLICATIONS

Article entitled: "Metallverklebungen im Maschinenbau", H. Kretzchmar, 1956.
Article entitled: "FAG Spindellager fur Werkzeugmaschinen", Pub. No. 41114, Apr. 20, 1970, Schafer & Co.

Primary Examiner—Joseph M. Gorski
Assistant Examiner—S. Thomas Hughes
Attorney, Agent, or Firm—Lee, Mann, Smith, McWilliams, Sweeney & Ohlson

[57] ABSTRACT

The outer ball bearing races (16, 26) of two ball bearings (12, 14) are supported on each other through a cardan joint (42). Axial bias forces in opposite directions are exerted on the inner ball bearing races (18, 28) by screws (44, 50) through cardan joints (48, 54). When the ball bearings rotate the outer ball bearing races (16, 26) are aligned. By means of a curing bonding agent the outer ball bearing races (16, 26) are fixed in a bearing sleeve (10) and the inner ball bearing races (18, 28) are fixed to a shaft (36) when the ball bearings rotate.

7 Claims, 3 Drawing Sheets

METHOD OF COMPENSATING FOR TOLERANCES IN A ROTARY MOUNTING HAVING BALL BEARINGS

TECHNICAL FIELD

The invention relates to a method of compensating for tolerances in a rotary mounting having two ball bearings which are located in a bearing member and have inner and outer ball bearing races each, the ball bearings being tensioned against each other.

BACKGROUND ART

In order to achieve an unlimited degree of freedom of rotation between two units, it is known to provide two ball bearings axially displaced relative to each other and to tension them in axial direction against each other. This results in high translational rigidity. A low friction results about the axis of the degree of freedom of rotation.

It is known to align ball bearings in a bearing sleeve or the like at the outer surfaces of the outer bearing races. However, defects of these surfaces with respect to the raceways of the ball bearing races affect the mounting and, for example in gyro mountings, result in drifts of the gyro.

A fixed mounting for a spindle having a rolling bearing transmitting the radial forces of the spindle and a crossrolling bearing taking up the radial forces is known from DE-A-37 10 185. A spacer ring is located between the outer rings of the rolling bearings. Compression springs are built in into the spacer ring and adjust the outer race of the radial rolling bearing to eliminate backlash. A resiliently yielding spring ring is built in between an end face of the outer race and a housing cover in order to hold the outer race on a shoulder of the spacer ring without the risk of an inclination.

U.S. Pat. No. 4,665,605 shows a cardan arrangement for driving a dynamically tuned gyro. A gyro rotor is coupled to a driving shaft through this cardan arrangement.

In the journal "Plaste und Kautschuk" (1956), 127–130, the application of glues in mechanical engineering is described. For example, bearing bushings are eccentricity-free glued in place in bores of a machine element by means of a centering device.

In a company brochure No. 41 114 "FAG Spindellager für Werkzeugmaschinen" of FAG Kugelfishcher Georg Schäfer & Co, Schweinfurt, pairs of spindle bearings are described which are biased by cup springs. Thereby, running free from backlash and high rigidity of the spindle system is achieved. Both of the bearings are loaded in all of the operational states.

DE-C-30 18 091 describes a shaft bearing free from backlash for a gyro rotor having two coaxial rolling body systems, the axial bias of which is adjustable. The outer raceways of the systems are formed by an integral bushing. One of the inner raceways is formed by the shaft. The other inner raceway is formed by an inner bearing ring. The inner bearing ring is located on the shaft with a fit which permits displacement by high axial force only.

DE-U-86 31 287 shows a mounting for a shaft in which an abutment is arranged between an axial bearing and a radial bearing, this abutment being formed as insert, takes up forces and is connected to a housing. Several spring elements acting on the races are provided within the abutment. Thereby, the bearing is always biased.

DISCLOSURE OF INVENTION

It is the object of the invention to provide a method of compensating for tolerances in a rotary mounting having two ball bearings.

It is a further object of the invention to produce a rotary mounting of the type defined in the beginning which operates smoothly and has long useful life.

It is a still further object of the invention to reduce the costs of making such a mounting.

According to the invention these objects are achieved by the method steps:

a) supporting the ball bearing races of a first type on each other through an inner universally movable joint, the pivot point of which is located on the axis of rotation of the pivot mounting,
b) exerting axial forces in opposite directions on the ball bearing races of the second type through outer universally movable joints, the pivot points of which are located on the axis of rotation of the pivot mounting,
c) fixing the ball bearing races of the first type in the bearing member, while such forces are exerted.

Advantageously, the ball bearing races of the first type are the outer ball bearing races and the ball bearing races of the second type are the inner ball bearing races.

The supporting and the exerting of forces can be effected through cardan joints as universally movable joints. Such cardan joints are available, for example, in the form of spring joints of the type described in U.S. Pat. No. 4,665,605.

The fixing can be effected by means of a curing bonding agent which is introduced into a bonding slot between the bearing member and the outer ball bearing races. The axial forces can be exerted by screws, which are screwed into the end face of a shaft mounted in the ball bearings and the heads of which engage the outer universally movable joints. The inner and outer ball bearing races can rotate relative to each other during the fixing process. The outer universally movable joints as well as the screws can be removed after the fixing of the outer ball bearing races. The inner universally movable joint remains in the bearing.

An embodiment of the invention will now be described in greater detail with reference to the accompanying drawings.

PREFERRED EMBODIMENTS OF THE INVENTION

Figure 2:
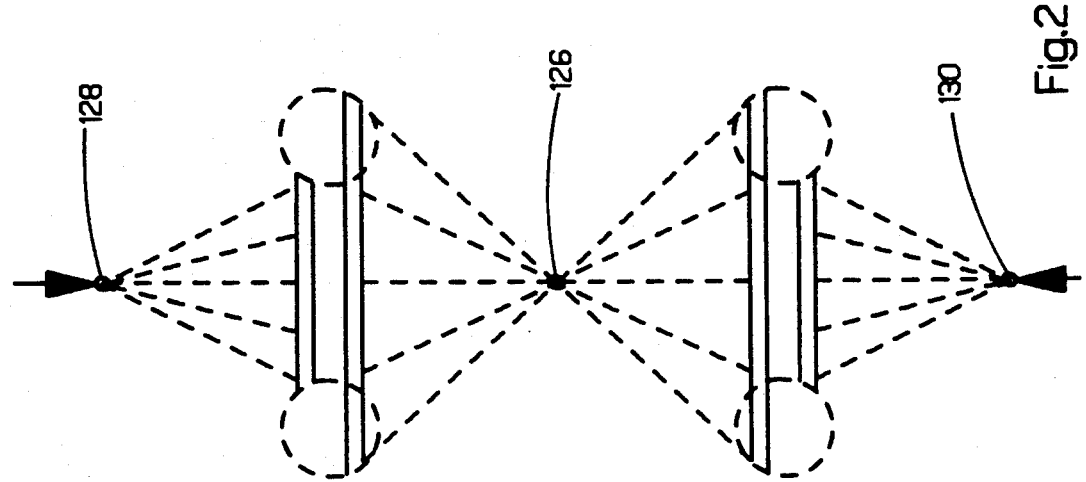
FIG. 2 is a schematical illustration and illustrates the compensation for tolerances in the method of the invention.

Two ball bearings 12 and 14 are axially spaced in a bearing sleeve 10. The ball bearing 12 has an outer ball bearing race 16 and an inner ball bearing race 18. Balls 20 are held between the ball bearing races 16 and 18. The inner ball bearing race 18 has a raceway 22. The raceway 22 is vaulted outwards at its upper end 24 in FIG. 1 and extends over the balls 20. The ball bearing 14 has an outer ball bearing race 26 and an inner ball bearing race 28. Balls 30 are held between the ball bearing races 26 and 28. The inner ball bearing race 28 has a raceway 32. The raceway 32 is vaulted outwards at its lower end 34 in FIG. 1 and extends under the balls 30.

The inner ball bearing races 18 and 28 are located on a shaft 36. The shaft 36 is a hollow shaft having a bore 38 and an internal thread 40.

A cardan joint 42 is located between the two outer ball bearing races 16 and 26. The two ball bearing races 16 and 26 are "ball bearing races of a first type", namely outer ball bearing races. The cardan joint 42 is a "universally movable joint". The cardan joint 42 surrounds the shaft 26. A screw 44 having a head 46 is screwed into the internal thread 40 from the upper end face of the shaft 36 in FIG. 1. A cardan joint 48 is located between the head 46 of the screw 44 and the end face of the inner ball bearing race 18. Furthermore, a screw 50 having a head 52 is screwed into the internal thread 40 from the upper end face of the shaft 36 in FIG. 1. A cardan joint 54 is located between the head 52 and the end face of the inner ball bearing race 28. The two ball bearing races 18 and 28 are "ball bearing races of a second type", namely inner ball bearing races. The cardan joints 48 and 54 are likewise "universally movable joints". Also the cardan joints 48 and 54 are annular and surround the shafts of the screws 44 and 50, respectively.

Bonding slots 56 and 58, respectively, are formed between the bearing sleeve 10 on one hand, and the outer ball bearing races 16 and 28 on the other hand. A curing bonding agent is introduced into these bonding slots 56 and 58 as a means for fixing the outer ball bearing races 16 and 26 within the bearing sleeve 10. Correspondingly, curing bonding agent is introduced into the bonding slots 57 and 59 between the inner ball bearing races 18 and 28, respectively, and the shaft 36.

Figure 3:
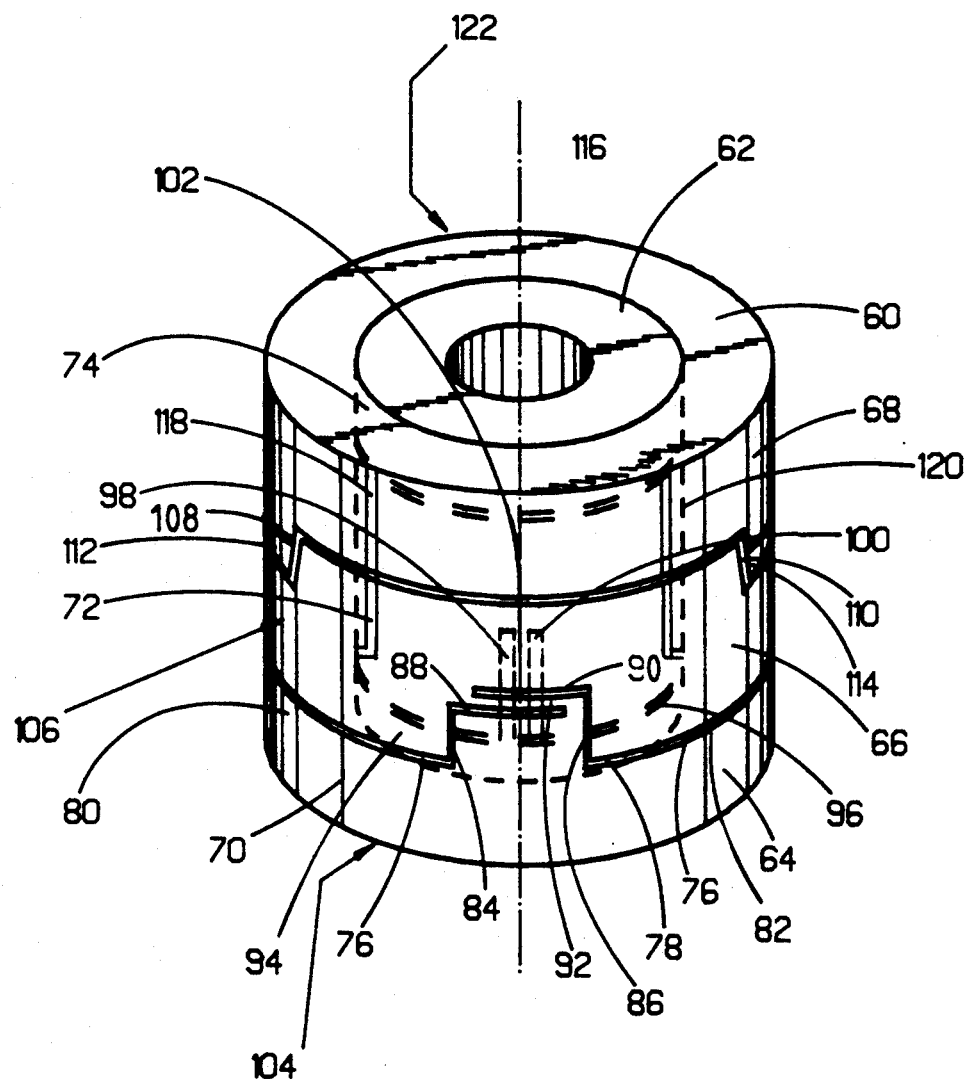
FIG. 3 is a schematic-perspective illustration of a cardan joint usable as universally movable joint in the method.
Figure 4:
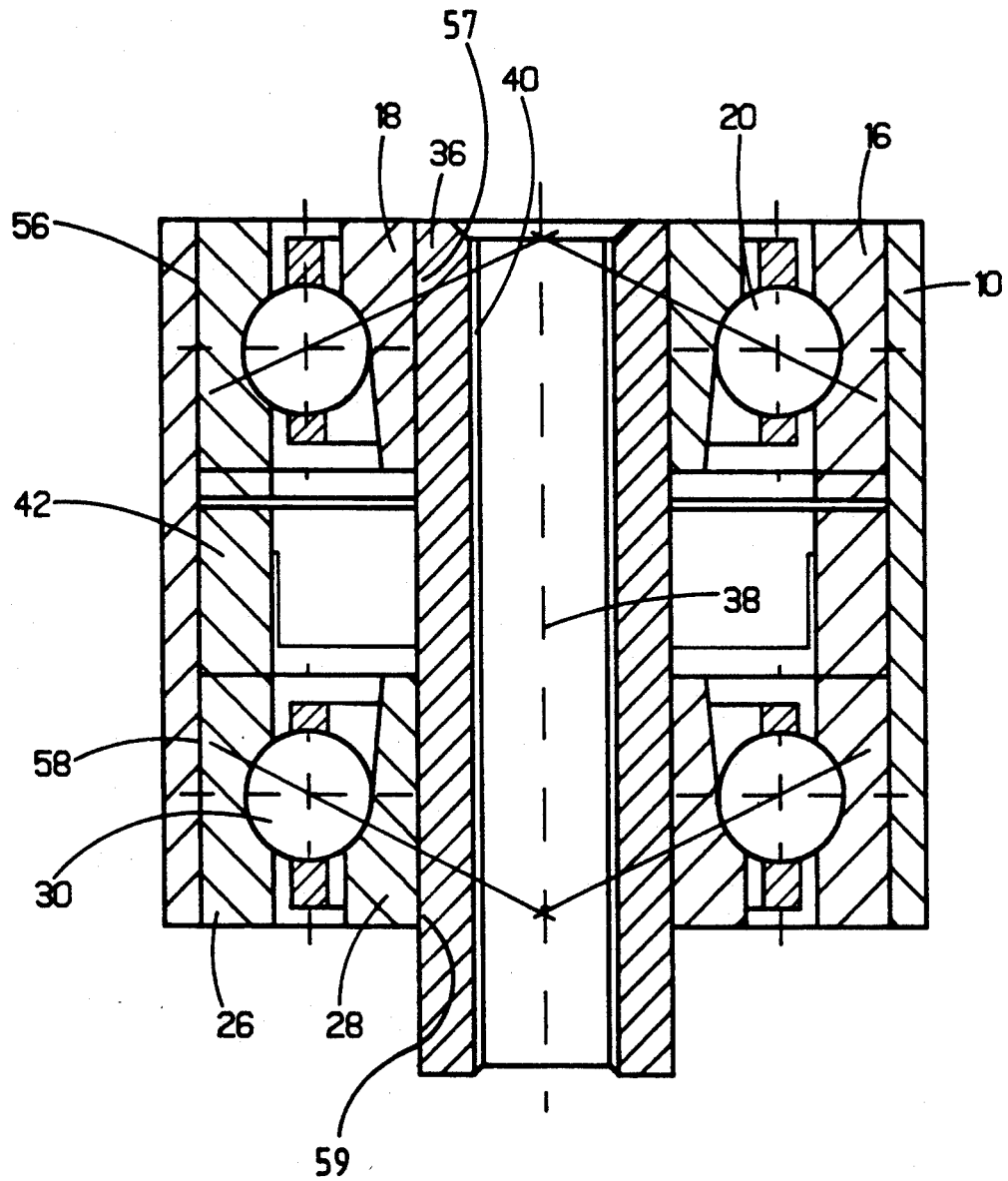
FIG. 4 shows an assembled bearing unit.

The construction of the cardan joints 42, 48 and 54 can be seen from FIG. 3. These cardan joints are similar to that disclosed in U.S. Pat. No. 4,665,605.

Each cardan joint 42, 48, 54 consists of two coaxial annular bodies 60 and 62. The annular bodies are divided into three rings each by circumferential cuts. The outer annular body 60 is divided into three rings 64, 66 and 68. The inner annular body 62 is divided into three rings 70, 72 and 74. The ring 64 is connected to the ring 70. The ring 66 is connected to the ring 72. The ring 68 is connected to the ring 74. Two cuts, a cut 76 and a cut 78, are formed between the ring 64 and the ring 66. Each of the cuts 76 and 78 has a central portion 80 and 82, respectively, extending over slightly less than 180°, and z-shaped end portions, of which only the end portions 84 and 86, respectively, are visible in FIG. 3. Corresponding end portions are provided offset by 180° on the rear side of the annular body 60 in FIG. 3. The sections 88 and 90, respectively, of the end portions extending in circumferential direction overlap and form a leaf spring 92 therebetween which extends in circumferential direction and through which the two rings 64 and 66 are interconnected. A corresponding leaf spring extending in circumferential direction is formed on the diametrically opposite side of the annular body 60.

The rings 70 and 72 of the inner annular body 62 are separated by two cuts 94 and 96. Each of the cuts 94 and 96 extends in circumferential direction over slightly less than 180° and has ends bent-off in axial direction. Only the front ends 98 and 100 are visible in FIG. 3. Correspondingly bent-off ends of the cuts 94 and 96 are provided on the opposite side of the annular body 62. A leaf spring 102 extending in axial direction is formed between the bent-off ends 98 and 100 of the cuts 94 and 96, respectively. The leaf spring 102 and a corresponding leaf spring angularly offset by 180° connect the rings 70 and 72. If only the rings 64 and 70 are connected to a first gimbal 104 and the rings 66 and 72 are connected to a second gimbal 106, then the leaf springs 92 and 102 as well as the corresponding leaf springs on the opposite side form flexural pivots. By these flexural pivots the two gimbals 104 and 106 are interconnected pivotally about an axis extending from the front to the back in FIG. 3.

In a corresponding way, the rings 66 and 68 are separated by two cuts 108 and 110 having z-shaped ends. These cuts form leaf springs 112 and 114 therebetween which extend in circumferential direction and through which the two rings 66 and 68 are interconnected. The leaf springs 112 and 114 are located in the same radial plane in the center of the ring 66 as the leaf spring 92, but are angularly offset by 90° relative thereto. Likewise, the rings 72 and 74 are separated by two cuts similar to the cuts 94 and 96, of which only the cut 116 is visible in FIG. 3. The bent-off ends of these cuts form leaf springs 118 and 120 therebetween which extend in axial direction and through which the rings 72 and 74 are interconnected. The leaf springs 118 and 120 cross the leaf springs 112 and 146 and form flexural pivots therewith. If the rings 68 and 74 are interconnected to a third gimbals 122, then the second and the third gimbal 106 and 122, respectively, are pivotally interconnected through a pair of flexural pivots 112, 118 and 114, 120 about an axis extending from the left to the right in FIG. 3. Then, the third gimbal 122 is connected universally movable relative to the first gimbal 104. The cardan joint thus formed is designed such that it primarily transmits axial forces, but is rather resilient radially and only transmits very small torques in the plane perpendicular to the bearing axis.

In many cases, simplified joints can be provided which only are constructed of the portions of the inner annular body 62, in which, thus, the joints only comprise the axial leaf springs, for example 102. These leaf springs transmit the forces in axial direction and allow the universally pivotal movement through the—very small—compensation angle.

Figure 1:
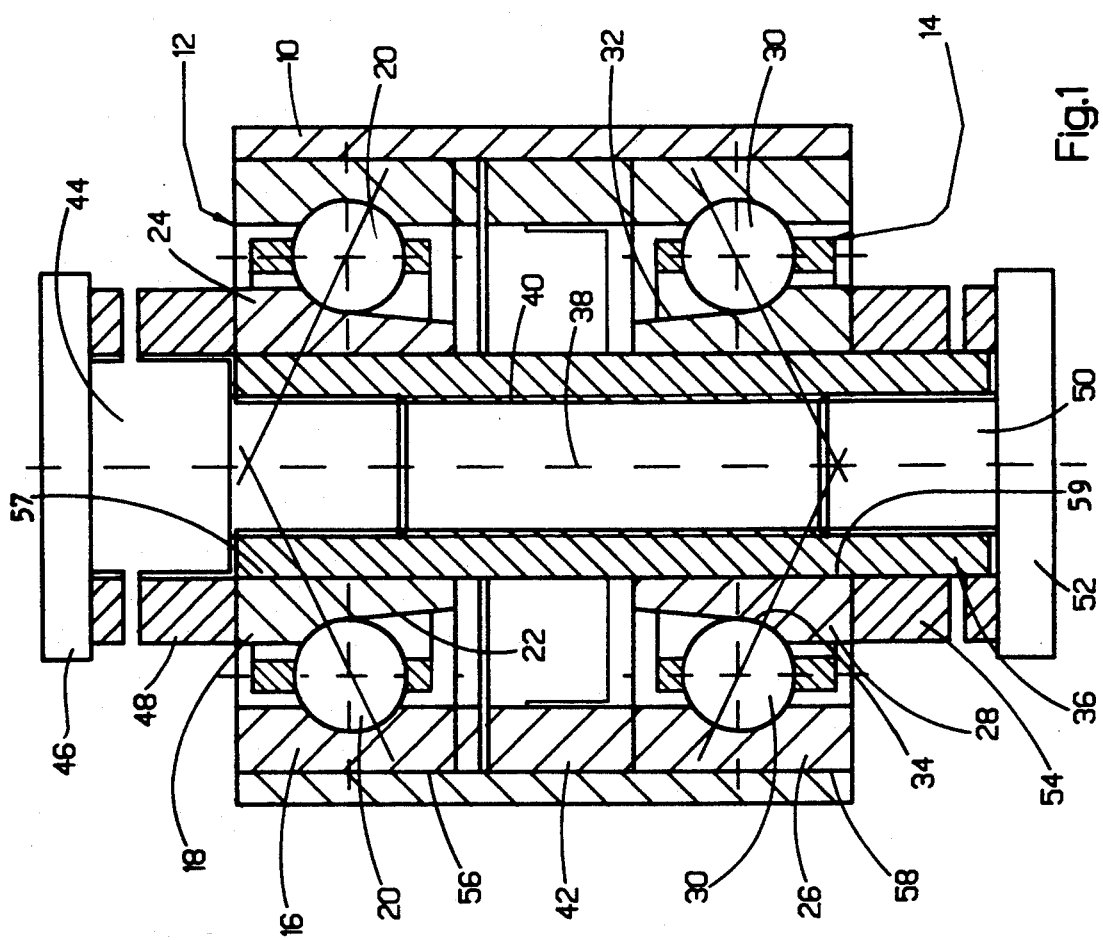
FIG. 1 shows a longitudinal section of a pivot mounting produced according to the method of the invention with the outer universally movable joints and screws for exerting the axial forces.

During assembly of the bearings illustrated in FIG. 1, the cardan joint 42 is inserted between the outer ball bearing races 16 and 26. The cardan joint 42 takes up the bearing bias through its high axial rigidity. However, the cardan joint does practically not transmit any torques such that the ball bearings 12 and 14 can be freely aligned. Analogously, the forces for providing the bearing bias are transmitted by the screws 44 and 50 through cardan joints 48 and 54 to the inner ball bearing races 18 and 28. The bearing is driven such that the inner ball bearing races 18, 28 rotate relative to the outer ball bearing races 16, 26. Thereby, the ball bearing races 16, 18, 26, 28 can be aligned under bias about the joint center points 126 and 128, 130, respectively. The kinematic relations are schematically illustrated in FIG. 2. All of the balls 20 and 30, respectively, transmit the same axial force. The raceways of the ball bearing races are correspondingly aligned. This position is fixed by the curing of the bonding agent in the approximately 1 to 2 m wide bonding slots 56, 58 and 57, 59, respectively.

The auxiliary elements, namely the screws 44 and 50 and the cardan joints 48 and 54, are detached, after the bonding agent has cured. The cardan joint 42 remains in the bearing unit. Then, the thus obtained bearing unit can, for example, be placed in a gyro housing.

I claim:

1. A method of compensating for tolerances in a rotary mounting having an axis of rotation and two ball bearings (12, 14) which are located in a bearing member (10) and have inner and outer ball bearing races (16, 26) each, the ball bearings being tensioned against each other, characterized by the method steps:

a) supporting the ball bearing races (16, 26) of a first type on each other through an inner universally movable joint (42), the inner universally movable joint having a pivot point located on the axis of rotation of the rotary mounting, b) exerting axial forces in opposite directions on the ball bearing races (18, 28) of a second type through outer universally movable joints (48, 54), the outer universally movable joints having pivot points located on the axis of rotation of the rotary mounting, c) fixing the ball bearing races (16, 26) of the first type in the bearing member (10), while such forces are exerted.

2. The method as set forth in claim 1, characterized in that the ball bearing races of the first type are the outer ball bearing races and the ball bearing races of the second type are the inner ball bearing races.

3. The method as set forth in claim 1, characterized in that the supporting and the exerting of forces are effected through cardan joints as universally movable joints (42, 48, 54).

4. The method as set forth in claim 1 characterized in that the fixing step comprises introducing a bonding agent into a bonding slot (56, 58) between the bearing member (10) and the ball bearing races (16, 26) of the first type.

5. The method as set forth in claim 1, characterized in that the exerting step comprises exerting axial forces by screwing screws (44, 50) into end faces of a shaft (36) mounted in the ball bearings (12, 14), the screws having heads (46, 52) which engage the outer universally movable joints (48, 54).

6. The method as set forth in claim 1, characterized in that the fixing step further comprises rotating the inner and outer ball bearing races (16, 18; 26, 28) relative to each other during the fixing process.

7. The method as set forth in claim 1, further comprising removing the outer universally movable joints after the fixing of the ball bearing races of the first type.

* * * * *